US012107372B2

(12) United States Patent
Tuenker et al.

(10) Patent No.: US 12,107,372 B2
(45) Date of Patent: Oct. 1, 2024

(54) ELECTRICAL CONNECTOR HAVING A CONTACTING ELEMENT DESIGNED AS A CAST PART

(71) Applicant: Phoenix Contact GmbH & CO. KG, Blomberg (DE)

(72) Inventors: Manuel Tuenker, Doerentrup (DE); Cord Starke, Blomberg (DE)

(73) Assignee: PHOENIX CONTACT GMBH & CO. KG, Blomberg (DE)

(*) Notice: Subject to any disclaimer, the term of this patent is extended or adjusted under 35 U.S.C. 154(b) by 446 days.

(21) Appl. No.: 17/441,309

(22) PCT Filed: Mar. 27, 2020

(86) PCT No.: PCT/EP2020/058643
§ 371 (c)(1),
(2) Date: Sep. 21, 2021

(87) PCT Pub. No.: WO2020/201043
PCT Pub. Date: Oct. 8, 2020

(65) Prior Publication Data

US 2022/0166172 A1 May 26, 2022

(30) Foreign Application Priority Data

Mar. 29, 2019 (BE) .................................. 2019/5198

(51) Int. Cl.
*H01R 13/6597* (2011.01)
*H01R 43/16* (2006.01)
*H01R 107/00* (2006.01)

(52) U.S. Cl.
CPC ......... *H01R 13/6597* (2013.01); *H01R 43/16* (2013.01); *H01R 2107/00* (2013.01)

(58) Field of Classification Search
CPC . H01R 13/6597; H01R 43/16; H01R 2107/00
(Continued)

(56) References Cited

U.S. PATENT DOCUMENTS 5,573,411 A * 11/1996 Bartosz ................ H01R 13/652 439/95
6,254,403 B1 * 7/2001 Bernardini ......... H01R 13/6583 439/95
(Continued)

FOREIGN PATENT DOCUMENTS

DE 29506732 U1 6/1995
DE 4419023 A1 12/1995
(Continued)

*Primary Examiner* — Peter G Leigh
(74) *Attorney, Agent, or Firm* — LEYDIG, VOIT & MAYER, LTD.

(57) ABSTRACT

A plug connector to be connected, by plugging, to a mating plug connector, includes a contact carrier manufactured from an electrically insulating material, an electrical grounding contact arranged at the contact carrier for electrical contact with the mating plug connector, and an electrically conductive housing part connected to the contact carrier. An electrically conductive contacting element is manufactured by means of a casting technique. The electrically conductive contacting element has a first contacting portion which bears against the housing part in an electrically contacting manner, and a second contacting portion which bears against the grounding contact in an electrically contacting manner, and electrically connects the housing part to the grounding contact.

18 Claims, 4 Drawing Sheets

(58) Field of Classification Search
USPC .......................................................... 439/695
See application file for complete search history.

(56) References Cited

U.S. PATENT DOCUMENTS

| | | | | |
|---|---|---|---|---|
| 6,780,068 | B2 * | 8/2004 | Bartholoma | H01R 13/648 439/95 |
| 8,956,170 | B2 * | 2/2015 | White | H01R 13/405 439/252 |
| 9,350,087 | B2 * | 5/2016 | Fink | H01R 4/00 |
| 2007/0158617 | A1 | 7/2007 | Greiner et al. | |
| 2012/0329323 | A1 | 12/2012 | Fink et al. | |
| 2015/0288108 | A1 * | 10/2015 | Fischer | H01R 13/6584 439/271 |
| 2016/0118752 | A1 * | 4/2016 | Guo | H01R 43/16 439/78 |
| 2018/0054026 | A1 | 2/2018 | Nolting | |

FOREIGN PATENT DOCUMENTS

| | | | | |
|---|---|---|---|---|
| DE | 102004003384 | B4 | 8/2004 | |
| DE | 102011012763 | A1 | 9/2011 | |
| DE | 102014112991 | A1 * | 3/2016 | H01R 13/424 |
| DE | 102015102703 | A1 | 8/2016 | |
| DE | 102017108162 | A1 * | 10/2018 | H01R 13/6597 |
| EP | 3276755 | A1 * | 1/2018 | H01R 13/521 |
| JP | H09115617 | A | 5/1997 | |
| WO | WO 2005057590 | A1 | 6/2005 | |

* cited by examiner

ELECTRICAL CONNECTOR HAVING A CONTACTING ELEMENT DESIGNED AS A CAST PART

CROSS-REFERENCE TO PRIOR APPLICATIONS

This application is a U.S. National Phase application under 35 U.S.C. § 371 of International Application No. PCT/EP2020/058643, filed on Mar. 27, 2020, and claims benefit to Belgian Patent Application No. BE 2019/5198, filed on Mar. 29, 2019. The International Application was published in German on Oct. 8, 2020 as WO 2020/201043 A1 under PCT Article 21(2).

FIELD

The invention relates to a plug connection to be connected, by plugging, to a mating plug connector, and to a method for producing a plug connector to be connected, by plugging, to a mating plug connector.

BACKGROUND

Such a plug connector comprises a contact carrier manufactured from an electrically insulating material, an electrical grounding contact arranged on the contact carrier for electrically contacting the mating plug connector, and an electrically conductive housing part connected to the contact carrier.

Such a plug connector may, for example, be connected to an electrical cable and be used to connect the electrical cable to a higher-level electrical assembly.

Given such a plug connector, the grounding contact (also referred to as a PE contact) arranged at the contact carrier serves to produce a grounding between the plug connector and the mating plug connector in order to thus provide the same ground potential at the plug connector and the mating plug connector. It is hereby desirable to connect contactable metal parts to the grounding contact in an electrically conductive manner in order to include such contactable metal parts in the grounding.

Given a plug connector that is to be used in stressed environments, for example in industrial environments, a housing part that at least partially delimits toward the outside and encloses the plug connector is designed, for example, as a metal part, and is thus electrically conductive. In order to also include the housing part in the grounding, an electrical connection between the housing part and the grounding contact is thus required that is conventionally established, for example by a metal spring designed as a stamped and bent part.

SUMMARY

In an embodiment, the present invention provides a plug connector to be connected, by plugging, to a mating plug connector. The plug connector includes a contact carrier manufactured from an electrically insulating material, an electrical grounding contact arranged at the contact carrier for electrical contact with the mating plug connector, an electrically conductive housing part connected to the contact carrier, and an electrically conductive contacting element manufactured by a casting technique. The electrically conductive contacting element has a first contacting portion which bears against the housing part in an electrically contacting manner, and a second contacting portion which bears against the grounding contact in an electrically contacting manner, and electrically connects the housing part to the grounding contact.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
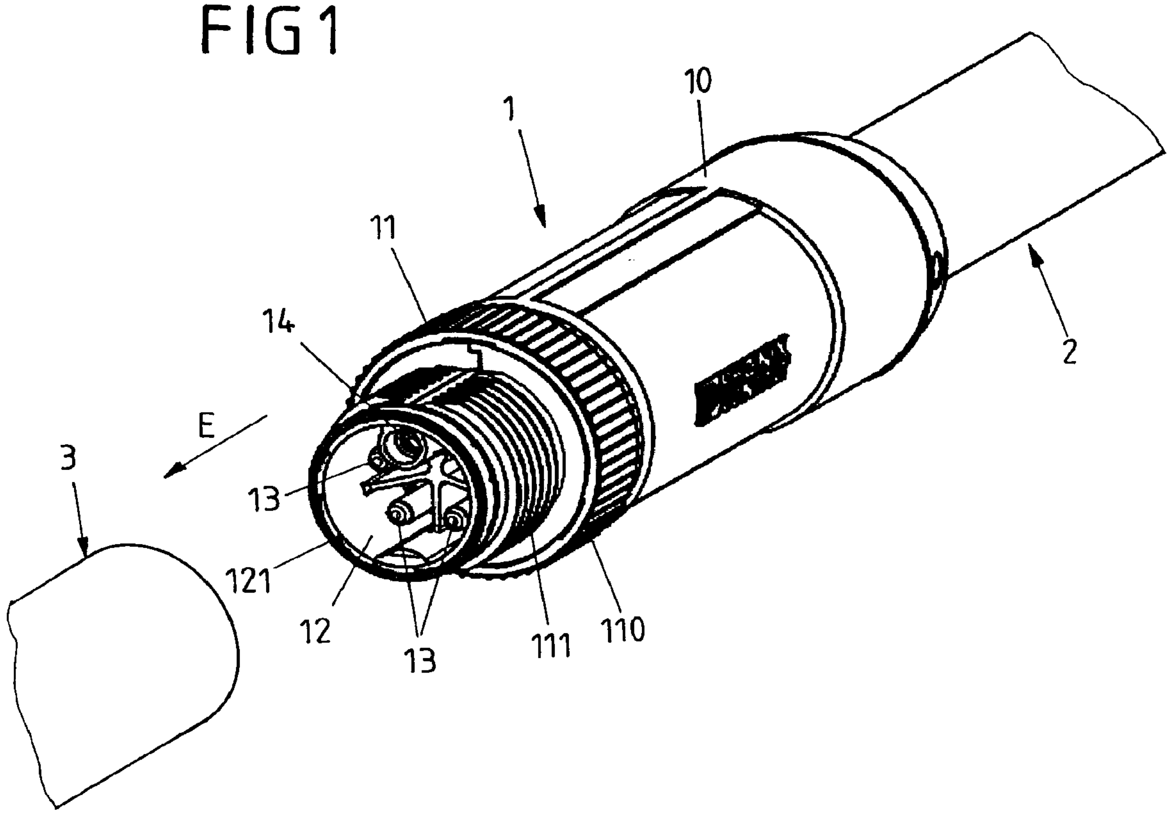
FIG. 1 a view of an exemplary embodiment of a plug connector connected to an electrical cable.

In an embodiment, the present invention provides a plug connector and a method for producing a plug connector which enable the establishment of an electrical connection between a grounding contact on a contact carrier and an electrically conductive housing part of the plug connector in a simple, automatable manner.

Accordingly, the plug connector has an electrically conductive contacting element manufactured by means of a casting technique, that has a first contacting portion which bears against the housing part in an electrically contacting manner, and a second contacting portion which bears against the grounding contact in an electrically contacting manner, and electrically connects the housing part to the grounding contact.

For the electrical connection of the grounding contact arranged at the contact carrier to an electrically conductive housing part, a contacting element that is manufactured by means of a casting technique is used in the piece connector. For example, the contacting element is designed as a cast metal part manufactured via metal casting, or an injection-molded part manufactured from an electrically conductive plastic via plastic injection molding. For example, a low-melting metal, for example an aluminum casting alloy or a tin casting alloy, in particular a tin soldering alloy, may be used as a material for a metal casting method. A material as described, for example, in WO 2005/057590 A1 can be used as the electrically conductive plastic material for a plastic injection molding.

The contacting element bears with the first contacting portion against the housing part, and with the second contacting portion against the grounding contact arranged at the contact carrier, thus contacts the housing part and the grounding contact, and in this way establishes an electrical connection between the housing part and the grounding contact. The housing part is thus at the ground potential prevailing at the grounding contact, and is thus included in the grounding.

In one embodiment, the contacting element is formed by the casting technique in situ on a preassembled unit formed by the contact carrier, the grounding contact, and the housing part. The contacting element is thus formed directly at the contact carrier by means of the casting technique that is used. For this purpose, a prefabricated assembly of the plug connector, consisting of the contact carrier, the grounding contact, and the housing part, may be inserted, for example into a casting tool, for example into a metal mold or an injection-molding tool, wherein components of the assembly are sealed against one another, and thus the contacting element may be formed in the tool directly at the prefabricated assembly. Upon forming, the contacting element may abut with the material forming the second contacting portion directly against the grounding contact arranged at the contact carrier, and thus may electrically contact the grounding contact. The contacting element is hereby preferably formed directly at the housing part, for example in that the material of the contacting element is poured in through an opening in the housing part and thus forms a material bond with the grounding contact on the one hand and the housing part on the other hand.

For the manufacturing of the contacting element in situ at the preassembled unit formed by the contact carrier, the grounding contact, and the housing part, the parts of this preassembled unit are sealed with respect to one another in particular such that, although the liquid casting material, in particular a metal material, flows around and electrically connects the housing part and the grounding contact, it has no electrical contact to other electrically conductive elements.

The parts of the preassembled unit hereby together form a cavity into which liquid material flows upon casting, in particular a liquid metal material, for the forming in situ at the preassembled unit. The cavity extends, for example, from an opening in the housing part into the contact carrier and around a shaft portion of the grounding contact, so that the contacting element for electrically contacting the grounding contact on the one hand and the housing part on the other hand may be formed by pouring into the cavity.

Alternatively, the housing part may optionally also be subsequently attached to the assembly in order to thereby contact the first contacting portion of the contacting element.

The housing part may, for example, create an enclosure (in portions) for the plug connector, and may be designed as a metal part for plug connectors that are to be designed to be load-bearing. The housing part is electrically conductive and electrically connected to the contacting element via the first contacting portion of said contacting element, and is connected via it to the grounding contact so that the housing part is at the ground potential prevailing at the grounding contact.

The housing part may, for example, be designed as a cast part, for example manufactured via zinc die casting or aluminum die casting. However, the housing part may also be manufactured, in particular for small batch production, as a turned part, for example from brass or steel, in particular stainless steel.

In one embodiment, the contact carrier has a receiving socket and the grounding contact has a shaft portion, wherein the grounding contact is arranged with the shaft portion in the receiving socket, and the second contacting portion of the contacting element bears against the shaft portion in an electrically contacting manner. The contact carrier is manufactured from an electrically insulating material, for example an insulating plastic material, and thus insulates the grounding contact from surrounding components of the plug connector. The grounding contact is inserted into an associated receiving socket of the contact carrier and, for example, is non-positively and/or positively fixed to the contact carrier (for example in a latching manner, or by pressing or caulking). The contacting element is hereby extended up to the grounding contact at the contact carrier in such a way that the contacting element with its second contacting portion electrically contacts the grounding contact, and is thus electrically connected to the grounding contact.

For example, the second contacting portion of the contacting element may extend circumferentially around the shaft portion of the grounding contact. The contacting portion thus forms—optionally after it is formed directly at the shaft portion of the grounding contact—an eyelet through which the contact element extends with its shaft portion so that a circumferential contacting exists between the contacting portion of the contacting element and the grounding contact, and a low-impedance, mechanically fixed connection is thus ensured between the contacting element and the grounding contact.

In one embodiment, the second contacting portion for contacting the grounding contact at the contact carrier is arranged radially inside the first contacting portion for contacting the housing part (with respect to a radial direction radial to a plug direction along which the plug connector is to be connected to an associated mating plug connector). The first contacting portion thus projects radially outward beyond the second contacting portion and may, for example, abut with a radially inward-facing inner surface of the housing part at a radially outward-facing outer surface, so that an electrical connection to the housing part is established via the first contacting portion of the contacting element.

Alternatively, the first contacting portion may also encompass the housing part at least in portions so that the first contacting portion is formed radially outside the housing part, for example by forming the contacting portion in situ on the housing part. In this instance, the contacting element may, for example, extend through an opening of the housing part in order to contact the grounding contact inside the housing part.

The contacting element thus contacts, via its first contacting portion, the housing part at a radially outer position and, via its second contacting portion, the grounding contact at a radially further inward position, and thereby establishes an electrical connection between the grounding contact arranged inside on the contact carrier and the housing part surrounding the contact carrier on the outside.

In one embodiment, the plug connector has an electrically conductive bearing element arranged radially outside the contact carrier and connected to the housing part, and a connecting element. The connecting element is borne on the bearing element so as to be rotatable about a plug direction along which the city connector can be connected, by plugging, to the mating plug connector, and is designed, for example, as a coupling nut via which the plug connector may be fixed, by screwing, to an associated mating plug connector. For this purpose, the connecting element in the form of the coupling nut has, for example, a threaded portion with an external thread formed thereon, by means of which a screwed connection may be established with an associated screw opening of the mating plug connector. The bearing element may hereby be designed, for example, as a sleeve which annularly surrounds the contact carrier and provides a slide bearing surface for rotatable bearing of the connecting element on the contact carrier.

For example, in one embodiment, the housing part may be formed integrally and in one piece with the bearing element.

In one embodiment, the contacting element is also connected to the bearing element in an electrically contacting manner. The electrically conductive bearing element is thus also electrically connected to the grounding contact of the contact carrier via the contacting element.

In one embodiment, the housing part is enclosed at least in portions by an electrically insulating casing part. The electrically insulating casing part may be formed, for example, via plastic injection molding on the housing part, and constitutes an outer, electrically insulating shell for the housing part. The casing part may, for example, be formed directly on the housing part via plastic injection molding, thus in situ if the contacting element has already been cast.

The casing part preferably forms an interior space circumferentially enclosed by the casing part. An electrical cable may hereby be introduced into the interior space of the casing part at an end of the casing part facing away from the contact carrier, so that such a region, in which cores of the cable are electrically connected to contact elements of the contact carrier, is enclosed by the casing part and thus encased and protected against the outside.

The housing part may, for example, also provide an electrical shielding against the outside.

In one embodiment, one or more electrical contact elements for electrically contacting the mating plug connector are arranged at the contact carrier in addition to the grounding contact. Via such contact elements, a useful electrical connection may be established between the piece connector and the mating plug connector, for example in order to transmit electrical power or exchange data signals. Each contact element is hereby arranged in an associated receiving socket of the contact carrier so that the contact elements and the grounding contact are electrically insulated from one another.

In one embodiment, the contact carrier forms a plug portion with which the plug connector may be connected, by plugging, to the mating plug connector along the plug direction. The plug portion may, for example, have a cylindrical basic shape and may circumferentially enclose the contacts such that the contact is embedded radially outward within the plug portion and is enclosed by the material of the plug portion circumferentially about the plug direction. When the plug connection is connected, by plugging, to the mating plug connector, the grounding contact electrically contacts an associated mating contact of the mating plug connector so that a common grounding is created between the plug connector and the mating plug connector.

The present invention in an embodiment also provides a method for producing a plug connection to be connected, by plugging, to a mating plug connector, wherein the method comprises: providing a contact carrier manufactured from an electrically insulating material, arranging an electrical grounding contact for electrically contacting the mating plug connector at the contact carrier, and providing an electrically conductive housing part to be connected to the contact carrier. In addition, the following is provided: manufacturing an electrically conductive contacting element on the contact carrier by means of a casting technique in such a way that the contacting element forms a first contacting portion and a second contacting portion bearing against the grounding contact in an electrically contacting manner.

The advantages and advantageous embodiments described in the preceding for the plug connector also apply analogously to the method, so that reference is made in this respect to the preceding statements.

Within the scope of the method, the contacting element is formed directly on the contact carrier by means of a casting technique. For this purpose, the contact carrier is provided with a grounding contact arranged thereon and is placed into a suitable casting tool. The contacting element is then formed, for example, by means of a metal casting method or by means of plastic injection molding (using an electrically conductive plastic material) on the contact carrier in such a way that the second contacting portion of the contacting element bears against the grounding contact and thus establishes an electrical connection to said grounding contact.

Upon the forming of the contacting element at the contact carrier, the housing part may already be connected to the contact carrier so that, in this instance, upon the forming of the contacting element, the first contacting portion abuts against the housing part directly (in situ) and thus establishes the electrical connection between the housing part and the contact carrier. The forming of the contacting element via the casting technique may hereby preferably take place in such a way that the material of the contacting element is poured through an opening of the housing part into a cavity at the contact carrier, so that the contacting element is formed at the grounding contact situated radially within the housing part and abuts against the housing part, and thereby extends between the grounding contact and the housing part for electrical contacting.

In another embodiment, the contacting element is initially formed at the contact carrier, and the housing part is only subsequently connected to the contact carrier in such a way that the housing part bears in an electrically contacting manner against the first allocating portion, and the contacting element thus electrically connects the housing part to the grounding contact. The contacting element is thus formed on the contact carrier when the housing part is not yet connected to the contact carrier. By subsequently attaching the housing part to the contact carrier, the housing part is also electrically connected to the contacting element and via it to the grounding contact at the contact carrier.

FIG. 1 shows an exemplary embodiment of a plug connector 1 which is connected to an electrical cable 2 and serves to connect to a mating plug connector 3. In order to connect the cable 2 to the mating plug connector 103, the plug connector 1 may be connected along a plug direction E to the mating plug connector 3 in that a plug portion 120 formed on a contact carrier 12 and forming a plug face is connected, by plugging, to the mating plug connector 3, in particular a plug opening formed on the mating plug connector 3.

Arranged at the contact carrier 12 of the plug connector 1 are electrical contact elements 13 which, when connected by plugging to the mating plug connector 3, electrically contact associated mating contacts of the mating plug connector 3 and serve to transmit useful currents, for example for electrical energy transmission or for data communication. In addition, the contact carrier 12 carries a grounding contact 14 which is at a ground potential and, upon being connected to the mating plug connector 3, contacts an associated grounding contact on the side of the mating plug connector 3 so that a common ground potential is provided at the plug connection created by the plug connector 1 and the mating plug connector 3.

The contact carrier 12 is manufactured from an electrically insulating material so that the contact elements 13 and the grounding contact 14 are electrically insulated from one another. Arranged on the contact carrier 12 is a connecting element 11 in the form of a coupling nut, which is borne on the contact carrier 12 so as to be rotatable about the plug direction E via a sleeve-shaped bearing element 15 which annularly surrounds the contact carrier 12. In the shown exemplary embodiment, the connecting element 11 has a threaded portion 111 which projects from a collar 110 having a knurling, on which an external thread is formed via which a screw connection to the mating plug connector 3 may be established when the plug connector 1 and the mating plug connector 3 are connected to one another.

The bearing element 15 is firmly connected to the contact carrier 12 and is formed from an electrically conductive material, in particular a metal material. The connecting element 11 is likewise manufactured, for example, from an electrically conductive material, in particular a metal material.

In the shown exemplary embodiment of the plug connector 1, a housing part 17 is connected to the contact carrier 12 in such a way that the housing part 17 adjoins the position element 15 on a side facing away from the connecting element 11. The housing part 17, shown in a view in FIG. 6, has a cylindrical basic shape and is formed integrally and in one piece with the bearing element 15.

The housing part 17 is electrically conductive and, together with the bearing element 15 and the connecting element 11 arranged thereon, thus provides an enclosure for the contact carrier 12.

Outside the housing part 17, a casing part 10 is formed which is manufactured from an electrically insulating plastic, for example by means of plastic injection molding, and is arranged outside the housing part 17 in such a way that the housing part 17 is externally surrounded by the casing part 10. The casing part 10 hereby extends beyond an end of the housing part 17 facing away from the connecting element 11 and encloses—as is visible in the sectional view according to FIG. 2—an interior space 100 within which cores 21 of the electrical cable 2 are connected to contact elements 13, 14 of the contact carrier 12.

The electrical cable 2 is introduced into the casing part 10 at an end remote from the contact carrier 12 and has a cable sheath 20 which encloses the cores 21. Within the casing part 10, the cores 21 are hereby stripped, by removing the outer cable sheath 20, and connected to the contact elements 13, 14 at the contact carrier 12, wherein the cores 21 may be enclosed by an electrically insulating material (for example, in that the cores 21 within the interior space 100 of the casing part 10 are potted via an electrically insulating casting compound) within the casing part 10 in a region between the end of the cable sheath 20 and the contact carrier 12.

Figure 2:
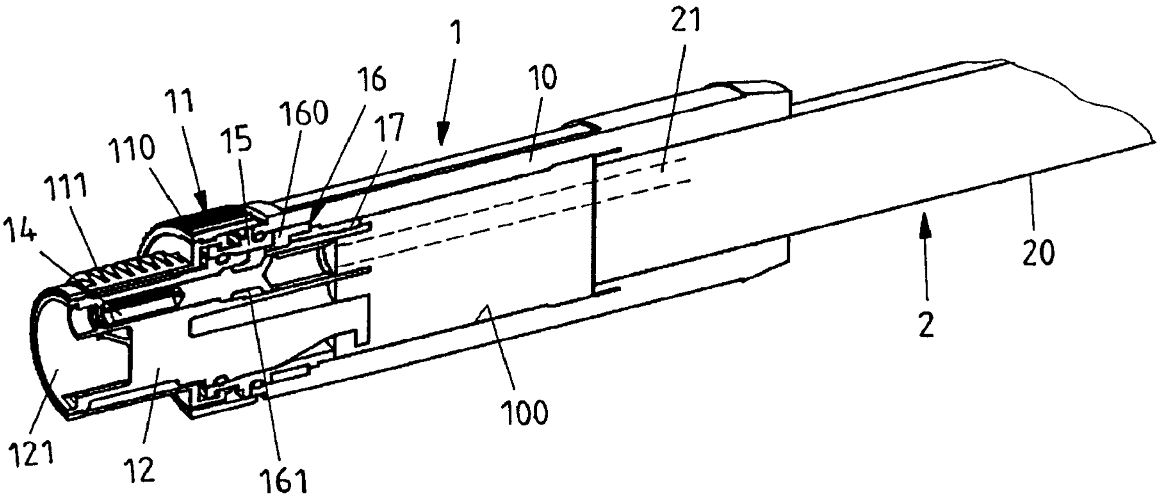
FIG. 2 a longitudinal sectional view through the plug connector.
Figure 3:
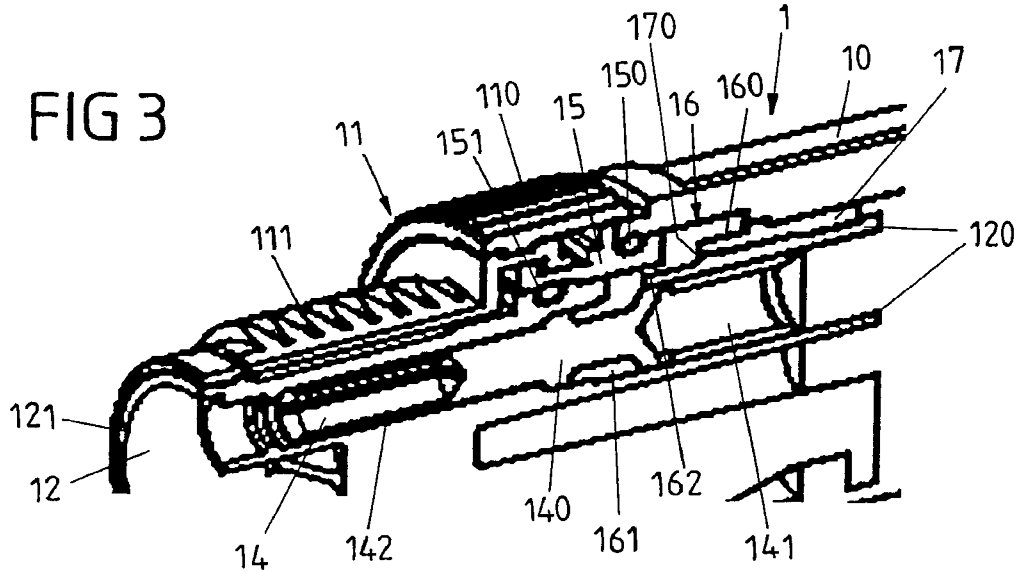
FIG. 3 an enlarged sectional view of the arrangement according to FIG. 2.

Via seals 150, 151, for example in the form of O-rings, the bearing element 15 is sealed in a moisture-tight manner against the casing part 10 and against the contact carrier 12, as shown in the sectional view according to FIG. 2 and the enlarged view according to FIG. 3.

In the shown exemplary embodiment, the housing part 17 is manufactured from an electrically conductive material, in particular a metal material, for example as an aluminum die-cast part or zinc die-cast part. Because the housing part 17 may be touched by a user during use, for example via the bearing element 15 and the connecting element 11 arranged thereon, it is advantageous to include the housing part 17 in the grounding of the connector 1 and to set it to the ground potential prevailing at the grounding contact 14, in order to eliminate a hazard to a user touching the connector 1.

In order to establish an electrical connection between the housing part 17 and the grounding contact 14, in the shown exemplary embodiment a contacting element 16 is provided that is arranged electrically between the housing part 17 and the grounding contact 14 and electrically connects the housing part 17 and the grounding contact 14 to one another. The contacting element 16 is formed by means of a casting technique from an electrically conductive material, wherein the formation may take place in situ directly on the contact carrier 12 given the grounding contact arranged at the contact carrier 12.

The contacting element 16 is formed, for example, by means of metal casting as a cast metal part, or from an electrically conductive plastic by means of plastic injection molding.

Figure 5:
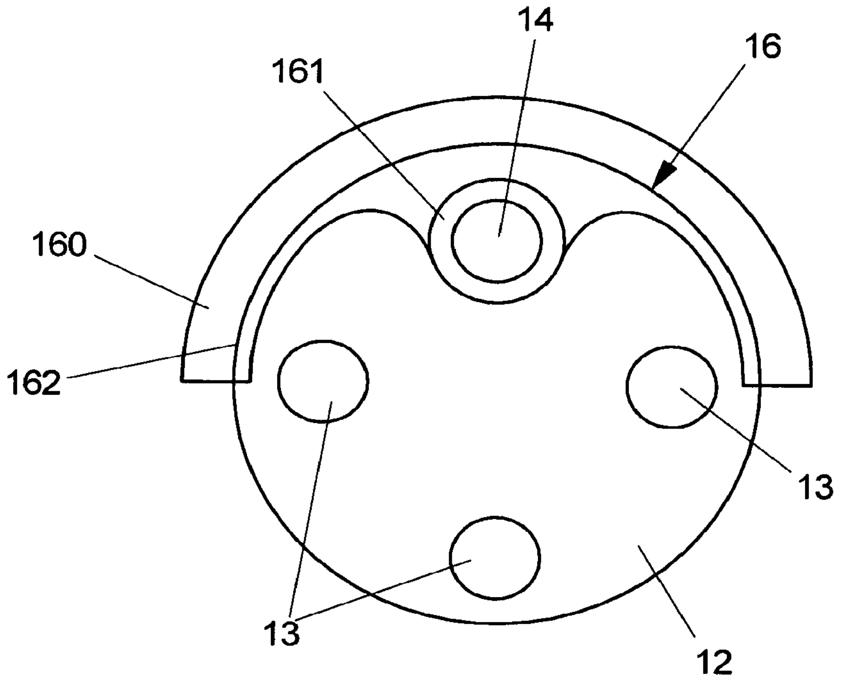
FIG. 5 a schematic view of a contacting element at a contact carrier of a plug connector.

The contacting element 16 is formed in such a way that it forms a contacting portion 161 which extends at the contact carrier 12 up to the grounding contact 14, arranged in a receiving socket 120 of the contact carrier 12, and circumferentially surrounds a shaft portion 140 of the grounding contact 14, as shown in FIG. 3 in conjunction with the schematic view according to FIG. 5. The grounding contact 14 lies in the receiving socket 120 of the contact carrier 12 and, on its side facing toward the plug portion 120, forms a contact socket 142 and, on its other side facing away, forms a connection portion 141 for connecting to an associated core 21 of the cable 2. The shaft portion 140 is substantially cylindrical and, after the forming of the contacting element 16, is surrounded circumferentially by the material of the contacting portion 161.

The contacting element 16 forms a further contacting portion 160 which is connected via an intermediate portion 162 to the contacting portion 161 associated with the grounding contact 14, and is associated with the housing part 17 in such a way that the contacting portion 160 comes to rest radially outside of the housing part 17, thus at least partially externally encompasses the housing part 17, bears in an electrically contacting manner against the housing part 17, and thus establishes an electrical connection to the housing part 17.

The intermediate portion 162 extends on the inside of the bearing element 15 and, in the longitudinal section plane according to FIGS. 2 and 3, forms a step in order to extend from the housing part 17 formed in one piece with the bearing element 15 to the grounding contact 14.

Figure 4:
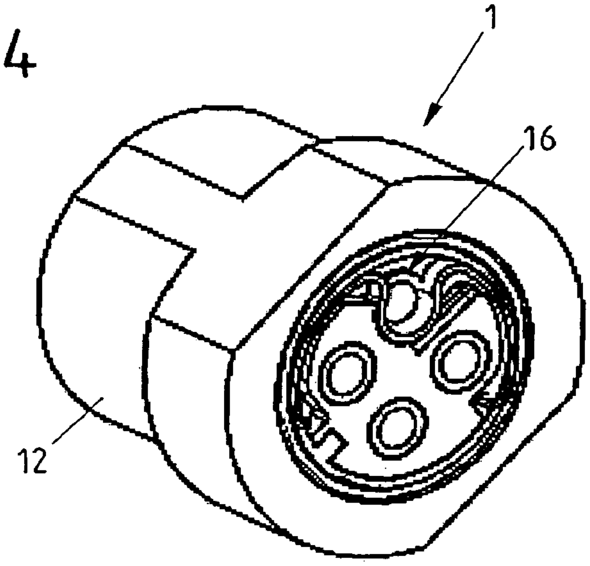
FIG. 4 a separate, partially sectional view of a contact carrier of a plug connector.

With regard to an axis of the substantially cylindrical plug connector 1 pointing along the plug direction E, the contacting portion 161 of the contacting element 16 associated with the contact carrier 12 is arranged radially inside the contacting portion 160 associated with the housing part 17, as shown in the schematic view according to FIG. 5. The contacting element 16 may hereby be in the form of a conventional contacting spring, shown in FIG. 4 and formed as a stamped and bent part, and extend in portions in the shape of a crescent on the outside of the housing part 17.

The formation of the contacting element 16 may take place directly in situ at the contact carrier 12 and the housing part 17. The contacting element 16 may thus be formed at the contact carrier 12 after the contact elements 13, 14 have been inserted into associated receiving sockets 120 of the contact carrier 12 and been fixed to the contact carrier 12, and after the housing part 17 together with the bearing element 15 and optionally also the connecting element 11, are arranged at the contact carrier 12. By sealing the components of the preassembled units thus created with respect to one another, and by placing the unit into a suitable casting tool, the contacting element 16 is formed at the contact carrier 12 and the housing part 17 while also forming the contacting portion 160 associated with the housing part 17, so that, after removal of the assembly from the tool, the housing part 17 is electrically connected to the grounding contact 14.

Figure 6:
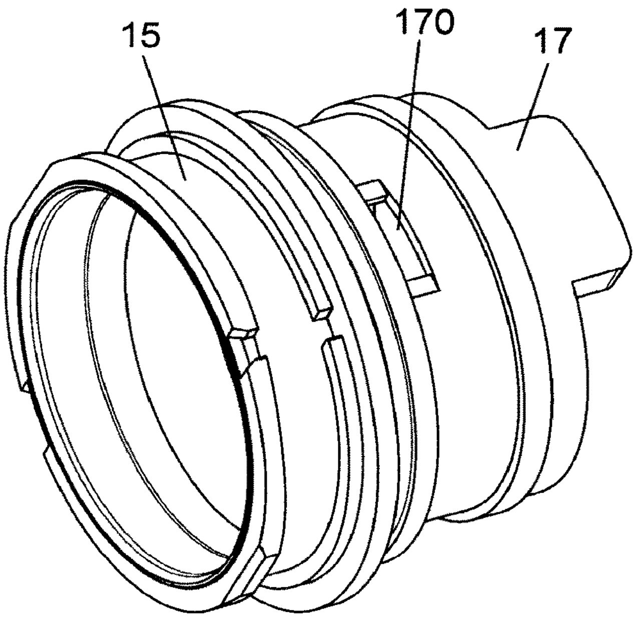
FIG. 6 an illustration of a housing part on which a contacting element is to be formed in situ.

As is visible in FIG. 6, an opening 170 may, for example, be provided at the housing part 17 at the housing part 17 for the forming of the contacting element 16 in situ, through which opening 170 material may be poured into the space associated with the contacting element 16 in order to form the contacting element 16 on the contact carrier 12, radially inside the housing part 17. The opening 170 is formed on the housing part 17 and provides access into a casting channel which is formed at the contact carrier 12, which casting channel extends toward and surrounds the shaft portion 140 of the grounding contact 14. In other words, the contact carrier 12, the housing part 17, and the grounding contact 14 form a cavity into which liquid material, in particular a metal material, flows in order to form the contacting element 16 during casting.

Alternatively, after forming the contacting element 16 on the contact carrier 12, the housing part 17 may also be attached to the assembly thus created in order to in this instance establish electrical contact between the contacting element 16 and the housing part 17 by the housing part 17 abutting against the contacting element 16 from the outside.

In the exemplary embodiment shown schematically in FIG. 5, the contacting portion 160 extends over a circular arc segment on the outside of the housing part 16 and conforms, after being formed in situ on the assembly comprising the housing part 17, the contact carrier 12, and the grounding contact 14, to the outside of the housing part 16. The intermediate portion 162 hereby extends through the opening 170 in the housing part 16 toward the grounding contact 14 in order to circumferentially surround and thereby contact the grounding contact 14 with the contacting portion 161.

Figure 7:
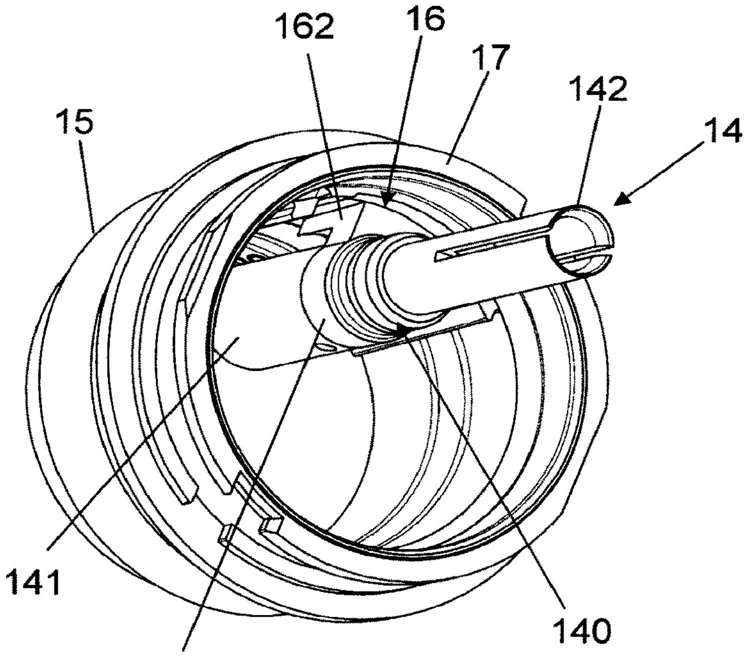
FIG. 7 a view of the housing part with a contacting element formed thereon.
Figure 8:
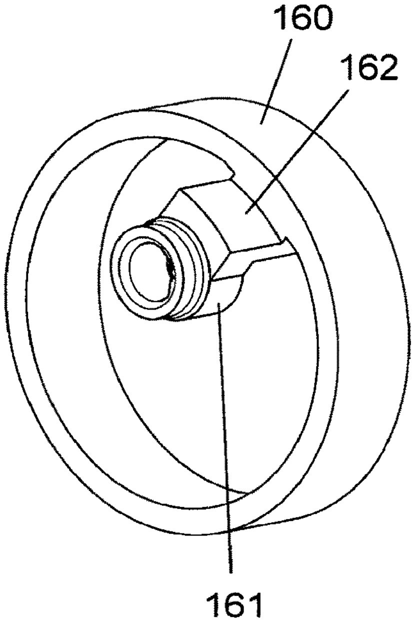
FIG. 8 a separate view of the contacting element formed in situ on the housing part.

In another embodiment shown in FIGS. 7 and 8, the contacting portion 160 associated with the housing part 17 extends annularly around the housing part 17 so that the contacting portion 160 circumferentially surrounds the housing part 17. The contacting element 16 is again formed in situ on the unit comprising the housing part 17, the contact carrier 12, and the grounding contact 14, wherein the liquid material flows around the housing part 17 in the casting tool upon casting and thus forms the annular contacting portion 160.

While FIG. 7 shows the contacting element 16 at the housing part 17 and in connection with the grounding contact 14, FIG. 8 shows the contacting element 16 in a separate view. The intermediate portion 162 extends in a stepped manner between the radially outer contacting portion 160 encompassing the housing part 17 and the radially inner contacting portion 161 contacting the grounding contact 14.

The idea forming the basis of the invention is not limited to the exemplary embodiments described in the preceding, but can also be realized in another way.

A plug connector of the described type may serve to connect an electrical cable connected to the plug connector to a cable associated with a mating plug connector or a higher-level electrical unit.

Such a plug connector may be used for transmitting electrical currents for providing a power supply, or also for transmitting data signals.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Plug connector
10 Casing part
100 Interior space
11 Connecting element
110 Collar
111 Threaded portion
12 Contact carrier
120 Receiving socket
121 Plug portion
13 Contact elements
14 Grounding contact (PE contact)
140 Shaft portion
141 Connection portion
142 Contact socket
15 Bearing element
150, 151 Seal
16 Contacting element
160 Contacting portion
161 Contacting portion
162 Intermediate portion
17 Electrically conductive housing part
170 Opening
2 Electrical cable
20 Cable sheath
21 Core
3 Mating plug connector
E Plug direction

The invention claimed is:

1. A plug connector to be connected, by plugging, to a mating plug connector, the plug connector comprising:

a contact carrier manufactured from an electrically insulating material, an electrical grounding contact arranged at the contact carrier for electrical contact with the mating plug connector, an electrically conductive housing part connected to the contact carrier, and an electrically conductive contacting element, manufactured by a casting technique, that has a first contacting portion which bears against the housing part in an electrically contacting manner, and a second contacting portion which bears against the grounding contact in an electrically contacting manner, and electrically connects the housing part to the grounding contact, wherein the contacting element is formed in situ via the casting technique on a preassembled unit formed by the contact carrier, the grounding contact, and the housing part, wherein an opening is provided at the housing part for forming the contacting element in situ, through which opening material is pourable into a space associated with the contacting element to form the contacting element on the contact carrier, radially inside the housing part, wherein the opening provides access into a casting channel formed at the contact carrier, which casting channel extends toward and surrounds a shaft portion of the grounding contact.

2. The plug connector of claim 1, wherein the contacting element is manufactured by metal casting as a cast metal part.

3. The plug connector of claim 1, wherein the contacting element is manufactured from an electrically conductive plastic by plastic injection molding as an injection-molded part.

4. The plug connector of claim 1, wherein the contact carrier has a receiving socket and the grounding contact has a shaft portion, and wherein the grounding contact with the shaft portion is arranged in the receiving socket, and the second contacting portion of the contacting element bears against the shaft portion in an electrically contacting manner.

5. The plug connector of claim 4, wherein the second contacting portion of the contacting element circumferentially surrounds the shaft portion.

6. The plug connector of claim 1, wherein the first contacting portion projects radially outward beyond the second contacting portion.

7. The plug connector of claim 1, further comprising:

an electrically conductive bearing element arranged radially outside the contact carrier and connected to the housing part, and a connecting element which is borne on the bearing element so as to be rotatable about a plug direction along which the plug connector is connectable, by plugging, to the mating plug connector.

8. The plug connector of claim 7, wherein the contacting element bears against the bearing element in an electrically contacting manner.

9. The plug connector of claim 1, wherein the housing part is enclosed, at least in portions, by an electrically insulating casing part, and wherein the casing part forms a circumferentially enclosed interior space and an electrical cable is inserted into the casing part at an end of the casing part facing away from the contact carrier.

10. The plug connector of claim 1, further comprising:

at least one electrical contact element for electrically contacting the mating plug connector, which contact element is arranged on the contact carrier in addition to the grounding contact.

11. The plug connector of claim 1, wherein the contact carrier has a plug portion to which the plug connector is connectable, by plugging, along a plug direction to the mating plug connector.

12. The plug connector of claim 11, wherein the plug portion encloses the grounding contact circumferentially about the plug direction.

13. A method for producing a plug connector to be connected, by plugging, to a mating plug connector, the method comprising:

providing a contact carrier manufactured from an electrically insulating material, arranging an electrical grounding contact for electrically contacting the mating plug connector at the contact carrier, providing an electrically conductive housing part to be connected to the contact carrier, and manufacturing an electrically conductive contacting element by a casting technique at the contact carrier in such a way that the contacting element forms a first contacting portion for electrically contacting the housing part and a second contacting portion bearing against the grounding contact in an electrically contacting manner, wherein the contacting element is formed in situ via the casting technique on a preassembled unit formed by the contact carrier, the grounding contact, and the housing part, wherein an opening is provided at the housing part for forming the contacting element in situ, through which opening material is pourable into a space associated with the contacting element to form the contacting element on the contact carrier, radially inside the housing part, wherein the opening provides access into a casting channel formed at the contact carrier, which casting channel extends toward and surrounds a shaft portion of the grounding contact.

14. The method of claim 13, further comprising:

connecting the housing part to the contact carrier in such a way that the housing part bears against the first contacting portion in an electrically contacting manner so that the contacting element electrically connects the housing part to the grounding contact.

15. A plug connector to be connected, by plugging, to a mating plug connector, the plug connector comprising:

a contact carrier manufactured from an electrically insulating material, an electrical grounding contact arranged at the contact carrier for electrical contact with the mating plug connector, an electrically conductive housing part connected to the contact carrier, and an electrically conductive contacting element, manufactured by a casting technique, that has a first contacting portion which bears against the housing part in an electrically contacting manner, and a second contacting portion which bears against the grounding contact in an electrically contacting manner, and electrically connects the housing part to the grounding contact, wherein the contact carrier has a receiving socket and the grounding contact has a shaft portion, and wherein the grounding contact with the shaft portion is arranged in the receiving socket, and the second contacting portion of the contacting element bears against the shaft portion in an electrically contacting manner.

16. The plug connector of claim 15, wherein the second contacting portion of the contacting element circumferentially surrounds the shaft portion.

17. A plug connector to be connected, by plugging, to a mating plug connector, the plug connector comprising:

a contact carrier manufactured from an electrically insulating material, an electrical grounding contact arranged at the contact carrier for electrical contact with the mating plug connector, an electrically conductive housing part connected to the contact carrier, an electrically conductive contacting element, manufactured by a casting technique, that has a first contacting portion which bears against the housing part in an electrically contacting manner, and a second contacting portion which bears against the grounding contact in an electrically contacting manner, and electrically connects the housing part to the grounding contact, an electrically conductive bearing element arranged radially outside the contact carrier and connected to the housing part, and a connecting element which is borne on the bearing element so as to be rotatable about a plug direction along which the plug connector is connectable, by plugging, to the mating plug connector.

18. The plug connector of claim 17, wherein the contacting element bears against the bearing element in an electrically contacting manner.

* * * * *